W. V. TURNER.
LUBRICATOR FOR AIR PUMPS.
APPLICATION FILED SEPT. 7, 1904.

1,112,492. Patented Oct. 6, 1914.

WITNESSES
J. S. Custer
F. H. Parke

INVENTOR
Walter V. Turner
by E. Wright
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

LUBRICATOR FOR AIR-PUMPS.

1,112,492.  Specification of Letters Patent.  Patented Oct. 6, 1914.

Application filed September 7, 1904. Serial No. 223,611.

*To all whom it may concern:*

Be it known that I, WALTER V. TURNER, a citizen of the United States, residing in Wilkinsburg, county of Allegheny, and State of Pennsylvania, have invented a certain new and useful Improvement in Lubricators for Air-Pumps, of which the following is a specification.

This invention relates to lubricators, more particularly designed for use with air pumps, but also applicable to engines and other fluid pressure cylinders.

One object of the invention is to provide improved means for regulating the flow of oil to the cylinder whereby the feed may be accurately regulated so as to be neither too rapid nor too slow; and another object is to provide improved means for heating the lubricant to prevent freezing or thickening of the same in cold weather.

Figure 1:
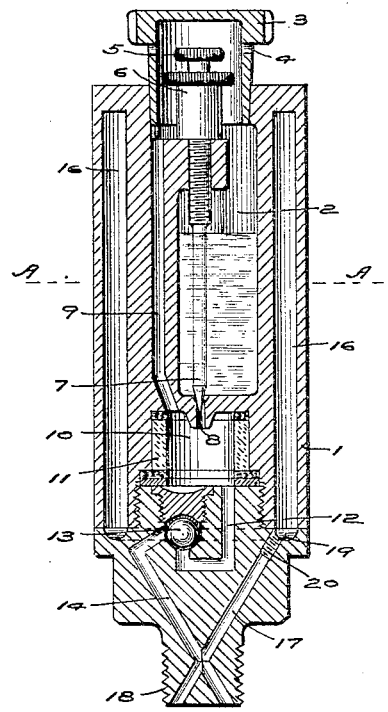
Figure 2:
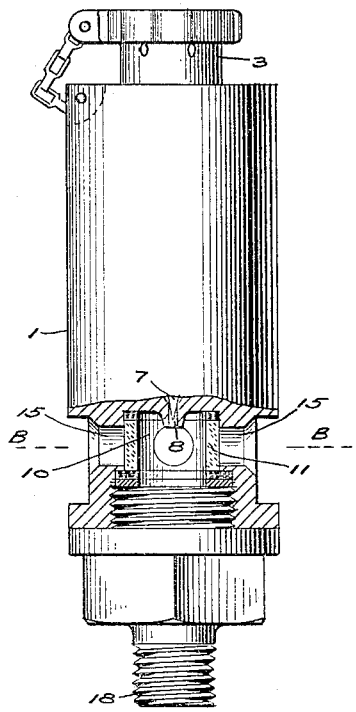
Figure 3:
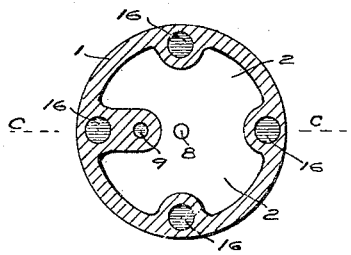
Figure 4:
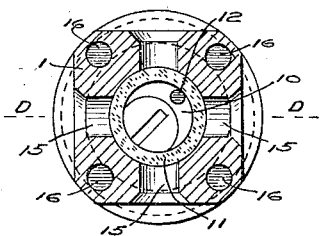

In the accompanying drawings, Figure 1 is a vertical section showing a lubricator embodying my improvements and taken on the line C—C of Fig. 3; Fig. 2 a view partly in elevation and partly in vertical section taken on the line D—D of Fig. 4; Fig. 3 a horizontal section taken on the line A—A of Fig. 1; and Fig. 4 a horizontal section taken on the line B—B of Fig. 2.

According to the construction shown the lubricator comprises a casing 1 containing a chamber 2 for the oil or other lubricant and provided with a cap 3 having perforations 4, whereby the space above the oil in the chamber is subject to atmospheric pressure. From the bottom of the oil chamber a feed port 8 leads into the drip chamber 10 and is controlled by needle valve 7 having thumb screw 5 and lock nut 6 for adjusting the feed. The drip chamber may be surrounded by a glass 11, and sight openings 15 may be provided at opposite points for observing the rate of feed of the oil. From the drip chamber a U-shaped passage 12 leads to the weighted ball check valve 13, from which the passage 14 discharges into the pump cylinder. The drip chamber communicates, by means of a passage 9 with the upper part of the oil chamber above the surface of the lubricant.

For the purpose of heating the lubricant the casing is provided with a jacketed space, here shown in the form of four vertical cylindrical cavities 16 formed in the casing and communicating with each other at their lower ends by means of the circular groove 19. It is obvious that this jacket space may be made in other forms or extend entirely around the lubricant chamber, if desired. This space communicates with the interior of the pump cylinder through a port 17. A screw threaded end 18 may be provided for conveniently attaching the lubricator to a pump cylinder. The passage 14 will be subject to the alternate suction and pressure produced by the pump piston as it reciprocates, thereby causing a corresponding movement of the ball check valve 13. Upon the suction stroke of the pump the check valve will open and whatever lubricant has fed through the needle valve into the drip chamber and the U-shaped passage 12 will be drawn into the pump cylinder with the air which enters through the passage 9. By means of this communicating passage 9 it will be noted that the lubricant in the main chamber is not subjected to the pull of the pump suction but remains substantially balanced as to air pressure, so that the gravity feed through the port 8 as regulated by the needle valve will be substantially constant and not affected by the action of the pump. Upon the compression stroke of the pump piston the check valve 13 is seated thereby preventing the oil in the drip chamber from blowing out through passage 9, and any leakage from said passage will not be objectionable since it will be caught in the upper part of the oil chamber and not escape to the outside of the casing.

By means of this improved construction the amount of lubricant which may be fed to the pump during any given period of time may be accurately regulated as desired.

Upon each compression stroke of the pump piston the air is compressed through port 17 into the jacket space 16 and this continual compression operates to generate sufficient heat to keep the lubricant warm even in the coldest weather. By this means the lubricant flows freely at all times and is prevented from thickening or freezing in the winter.

If desired, the passage 17 may be threaded at one portion, as indicated at 20, for inserting a plug, to prevent the generation of the heat and compression of the air in the jacket space during the summer or when used in warm climates.

Having now described my invention, what I claim as new and desire to secure by Letters Patent is:—

1. A lubricator for air pumps, comprising an oil chamber, an outlet-passage leading therefrom to the pump, a needle valve for controlling the flow of oil from the chamber into the outlet passage, a check valve in said passage adapted to seat away from the pump, and an air-inlet port leading from a point in said passage above the check valve and opening into the upper portion of the oil chamber.

2. A lubricator for air pump cylinders, comprising a casing containing an oil chamber opening at the top to the atmosphere, a drip chamber and a feed port leading from the oil chamber to said drip chamber, a closed reversely curved outlet passage leading from the drip chamber to the pump cylinder, a check valve actuated by gravity and the pump pressure for normally closing said outlet passage, and a separate air inlet passage leading to the drip chamber for supplying air thereto upon the suction stroke of the pump.

3. In lubricating means adapted for connection to the piston-containing cylinder of an explosive engine, the combination of an oil-container having an outlet opening, a sight feed-chamber in communication therewith, an attaching nipple provided with an internal valve-chamber, a valve seated therein, there being also two passages in the nipple of which one connects with the valve-chamber below the valve therein and is open toward the sight-feed chamber, while the other connects the valve-chamber above the valve therein with the outside and a screw-plug seated in the bottom of the sight-feed-chamber to permit access to the valve-chamber below.

In testimony whereof I have hereunto set my hand.

WALTER V. TURNER.

Witnesses:
R. F. EMERY,
JAS. B. MACDONALD.

---

Copies of this patent may be obtained for five cents each, by addressing the "Commissioner of Patents, Washington, D. C."